(12) United States Patent
McCully et al.

(10) Patent No.: US 9,307,699 B2
(45) Date of Patent: *Apr. 12, 2016

(54) TRANSITION CHAMBER FROM AUGER TO ELEVATOR IN COMBINE HARVESTER

(71) Applicant: CNH Industrial America LLC, New Holland, PA (US)

(72) Inventors: William Mark McCully, Lancaster, PA (US); Clayton E. Banks, Brownstown, PA (US); Eric Emerson Veikle, Lititz, PA (US); Karl Robert Linde, Leola, PA (US); Todd Allen Cannegieter, Boiling Springs, PA (US); Curtis Frederick Hillen, Lititz, PA (US); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/780,926

(22) Filed: Feb. 28, 2013

(65) Prior Publication Data

US 2014/0243055 A1    Aug. 28, 2014

(51) Int. Cl.
| A01F 12/46 | (2006.01) |
| A01F 12/52 | (2006.01) |
| H04L 27/01 | (2006.01) |
| A01D 61/00 | (2006.01) |

(52) U.S. Cl.
CPC .............. *A01F 12/46* (2013.01); *A01D 61/008* (2013.01); *A01F 12/52* (2013.01); *H04L 27/01* (2013.01)

(58) Field of Classification Search
USPC ..................... 460/114; 56/14.5; 414/502, 523; 198/670, 671, 801
See application file for complete search history.

(56) References Cited

U.S. PATENT DOCUMENTS

| 1,017,129 | A | 2/1912 | Boe |
| 1,382,901 | A | 6/1921 | Gebhardt |
| 2,309,736 | A | 2/1943 | Melfred |
| 3,630,011 | A | 12/1971 | Dunn |
| 3,643,826 | A | 2/1972 | Weakly |
| 3,769,988 | A | 11/1973 | Burenga |
| 3,827,443 | A | 8/1974 | Drayer |
| 4,241,566 | A | 12/1980 | Webster |
| 4,269,200 | A | 5/1981 | Gorsler |
| 4,441,513 | A | 4/1984 | Herwig |
| 5,615,989 | A * | 4/1997 | Matousek et al. ............ 414/502 |
| 6,053,811 | A | 4/2000 | Johnson et al. |
| 6,350,197 | B1 | 2/2002 | Cooksey et al. |
| 8,007,353 | B1 | 8/2011 | Werning et al. |
| 8,045,168 | B2 | 10/2011 | Missotten et al. |
| 8,801,514 | B1 * | 8/2014 | McCully et al. .............. 460/114 |
| 2011/0086684 | A1 * | 4/2011 | Luellen et al. .................. 460/79 |

* cited by examiner

*Primary Examiner* — Alicia Torres
(74) *Attorney, Agent, or Firm* — Patrick M. Sheldrake (57) ABSTRACT

A grain conveyor for a combine harvester capable of increasing capacity and reducing component wear is disclosed. The grain conveyor includes a grain elevator, a transition chamber and an auger assembly. The grain elevator has an inlet for receiving a flow of grain. The transition chamber includes an inlet and an outlet in fluid communication with the transition chamber inlet and the grain elevator inlet. The transition chamber outlet has an asymmetric non-circular opening larger than the non-circular opening of the transition chamber inlet. The auger assembly is operatively connected to the transition chamber and includes an inlet for receiving a flow of grain and an outlet in fluid communication with the transition chamber inlet.

23 Claims, 12 Drawing Sheets

TRANSITION CHAMBER FROM AUGER TO ELEVATOR IN COMBINE HARVESTER

BACKGROUND OF THE INVENTION

The present invention relates generally to a grain conveyor for use with combine harvesters. In particular, the present invention relates to an improved grain conveyor having an asymmetric transition chamber between a clean grain trough and a clean grain elevator.

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG).

After passing through the threshing and separating assembly, the grain and MOG are deposited onto a grain cleaning system. The grain cleaning system of a typical combine includes a pair of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank.

In typical combines, a constant cross-section cylindrical transition chamber is used to allow grain from the auger trough to be passed to the grain elevator. Such cylindrical bodies of typical transition chambers also typically have sharp edged inlet and outlet orifices which adversely affect the overall performance and efficiency of the system. Such adverse effects include limiting the rate in which grain can be fed to the grain elevator as a result of the shape of the cylindrical transition chamber and its outlet, increased wear of grain conveying components, and damage to grain kernels. That is, the cylindrical shape of the transition chamber physically restricts the flow of grain passing therethrough and limits the area of grain flow exposed to the paddles of the grain elevator from the transition chamber.

Thus, there is still a need for a grain conveyor for conveying clean grain that is capable of addressing the aforementioned drawbacks of conventional clean grain conveyors. Such a need is satisfied by the grain conveyor for a combine harvester of the present invention.

BRIEF SUMMARY OF THE INVENTION

In accordance with a preferred embodiment, the present invention provides a grain conveyor for a combine harvester that includes a grain elevator, a transition chamber and an auger assembly. The grain elevator has an inlet for receiving a flow of grain. The transition chamber is connected to the grain elevator and includes an inlet having a non-circular opening and an outlet in fluid communication with the transition chamber inlet and the grain elevator inlet. The transition chamber outlet has an asymmetric non-circular opening larger than the non-circular opening of the transition chamber inlet. The auger assembly is operatively connected to the transition chamber and includes an inlet for receiving a flow of grain and an outlet in fluid communication with the transition chamber inlet.

In a second aspect, the present invention provides a clean grain conveyor for an agricultural combine including a paddle elevator, an auger conveyor and a transition chamber. The paddle elevator has an inlet for receiving grain. The auger conveyor conveys grain to the paddle elevator. The transition chamber has an inlet and an outlet and is positioned between the paddle elevator and the auger conveyor for the passage of grain from the auger conveyor to the paddle elevator. The transition chamber has an asymmetric longitudinal cross-section formed at least by a semicircle having a first radius of curvature, a second curve having a second radius of curvature smaller than the first radius of curvature, and a third curve having a third radius of curvature larger than the second radius of curvature.

In a third aspect, the present invention provides a grain conveyor for a combine harvester that includes a grain elevator, a transition chamber and an auger assembly. The grain elevator has an inlet for receiving a flow of grain. The transition chamber is connected to the grain elevator and includes an inlet having a non-circular opening and an outlet in fluid communication with the transition chamber inlet and the grain elevator inlet. The transition chamber outlet has an asymmetric non-circular opening. The auger assembly is operatively connected to the transition chamber and includes an inlet for receiving a flow of grain and an outlet in fluid communication with the transition chamber inlet.

In a fourth aspect, the present invention provides a grain conveyor for a combine harvester that includes a grain elevator, a transition chamber and an auger assembly. The grain elevator includes an inlet for receiving a flow of grain. The transition chamber is connected to the grain elevator and includes an inlet, and an outlet in fluid communication with the transition chamber inlet and the grain elevator inlet. The auger assembly is operatively connected to the transition chamber. The auger assembly includes an elongated trough having an inlet for receiving a flow of grain and an outlet in fluid communication with the transition chamber inlet. The auger assembly further includes an auger situated within the elongated trough and extending out through the auger assembly outlet. The auger includes a first set of auger flights having a larger diameter than a second set of auger flights situated upstream the first set of auger flights.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown.

In the drawings.

DETAILED DESCRIPTION OF THE INVENTION

Reference will now be made in detail to a preferred embodiment of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below, right, left, front, rear and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain" and "crop material" are used throughout the specification for convenience and it should be understood that these terms are not intended to be limiting. Thus, "grain" refers to that part of a crop which is harvested and separated from discardable portions of the crop material.

Figure 1:
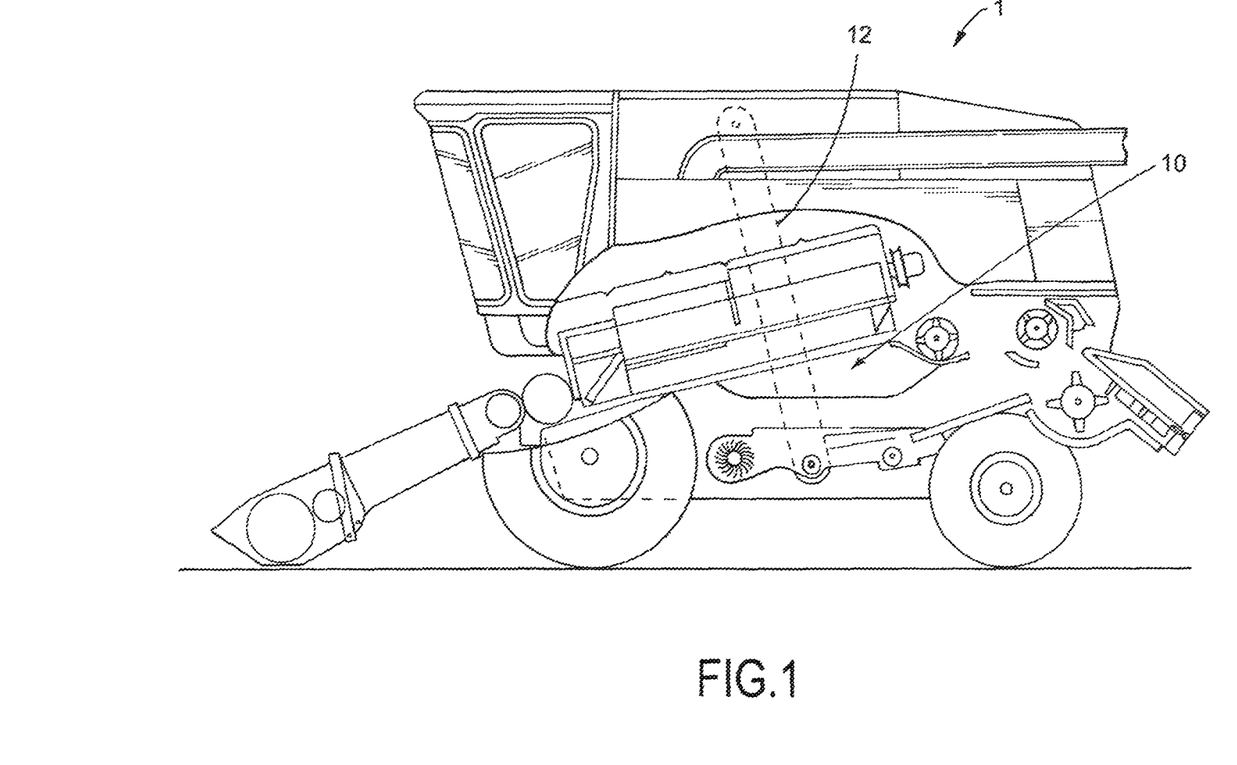
FIG. 1 is a simplified left side view of a combine harvester including a clean grain conveyor according to a preferred embodiment of the present invention.

In accordance with a preferred embodiment, the present invention provides a clean grain conveyor 10 for a combine harvester 1, as shown in FIGS. 1-11B. The grain conveyor 10 includes a grain elevator 12, a transition chamber 14 and an auger assembly 16. Referring to FIG. 1, the grain conveyor 10 is operatively connected to a rotateable power source (not shown), such as an internal combustion engine or the like, for rotatably driving the auger assembly 16 and grain elevator 12 for conveying clean grain from the grain conveyor 10 to a storage tank or grain tank (not shown) on the combine harvester 1.

Referring to FIGS. 2-11B, the grain conveyor 10 of the combine harvester 1 conveys grain to the onboard storage tank. The grain conveyor 10 includes the grain elevator 12, the transition chamber 14, and the auger assembly 16.

Figure 2:
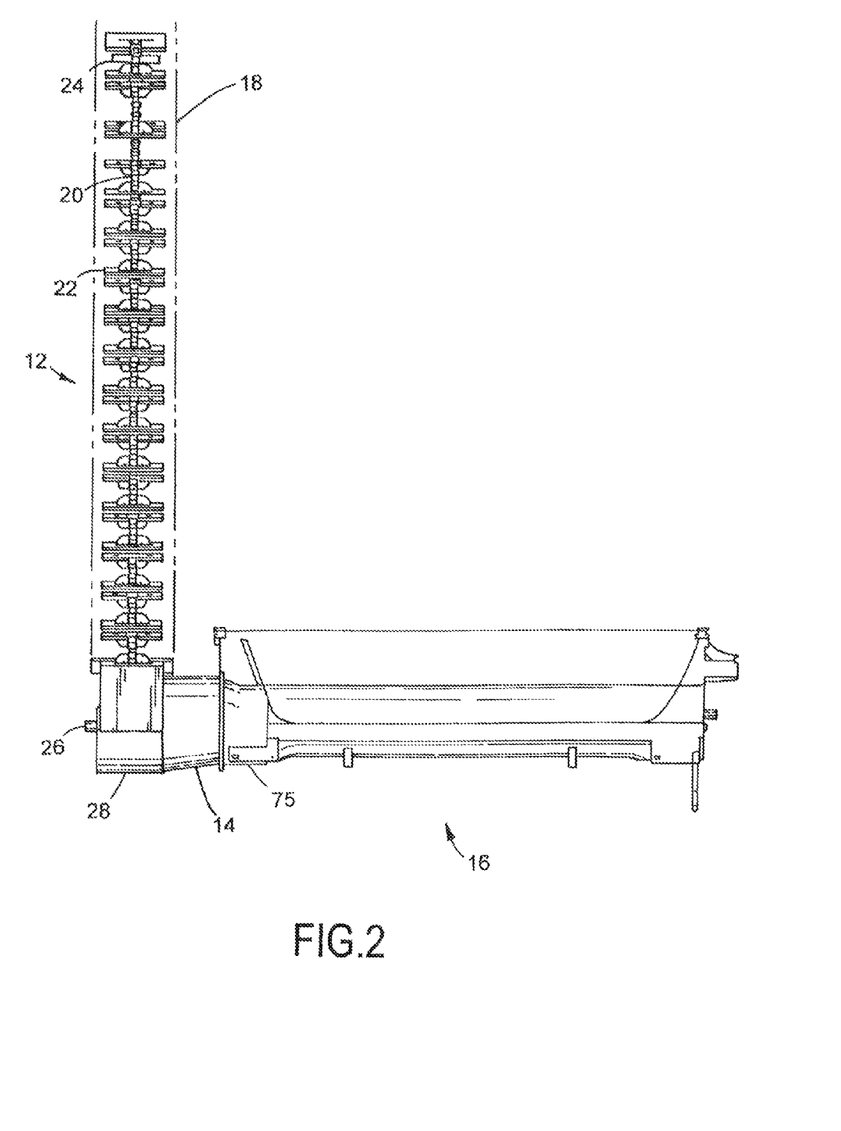
FIG. 2 is a front view of the clean grain conveyor of FIG. 1.

Referring to FIGS. 2-5, 11A and 11B, the grain elevator 12 is preferably configured as shown. As shown in FIG. 2, the grain elevator 12 includes a housing 18, an endless chain 20, and a plurality of paddles 22 connected to the endless chain 20 for receiving and conveying grain. The endless chain 20 loops around a pair of sprockets 24, 26 about opposite ends of the grain elevator 12. The sprocket 24 is positioned near a top most end of the housing 18 while the sprocket 26 is positioned near a bottom most end of the housing 18 or a boot portion 28 of the housing 18. The endless chain 20 rotates about axis A (FIG. 5) within the boot portion 28 of the housing 18. Axis A is concentric with a longitudinal axis of a shaft of an auger 30 of the auger assembly 16. Such grain elevators applicable to the present invention are known in the art and a further detailed description of their structure, function and operation is not necessary for a complete understanding of the present invention. However, grain elevators applicable to the present invention are disclosed in U.S. Pat. Nos. 8,045,168 and 6,350,197, the entire disclosures of which are hereby incorporated by reference herein.

Figure 11A:
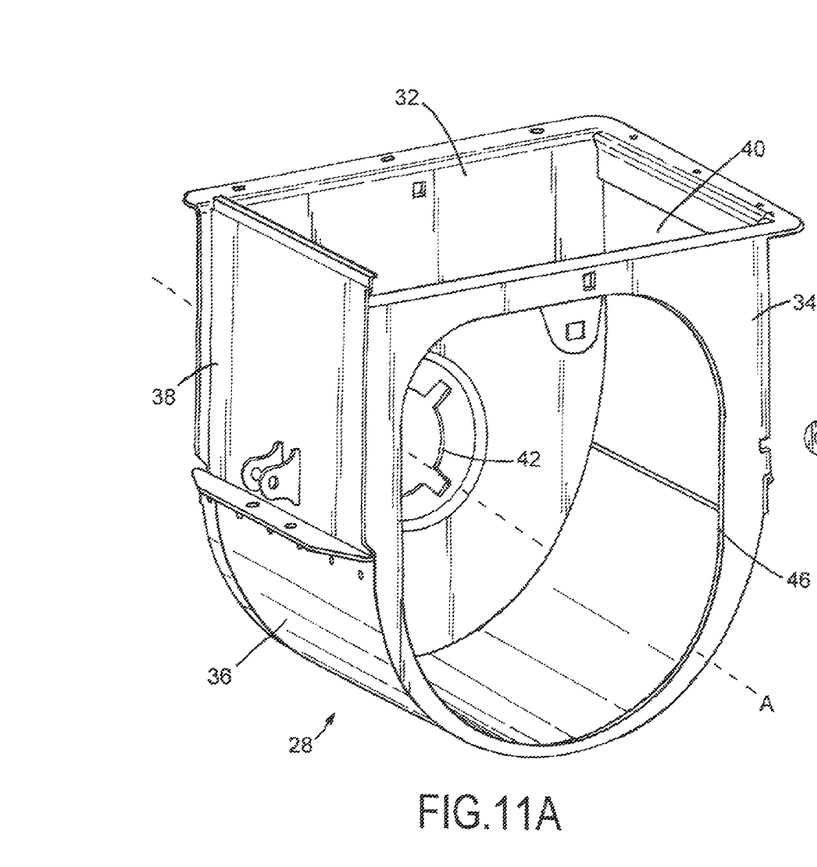
FIG. 11A is a perspective view of a housing's boot portion of a grain elevator of the clean grain conveyor of FIG. 2.
Figure 11B:
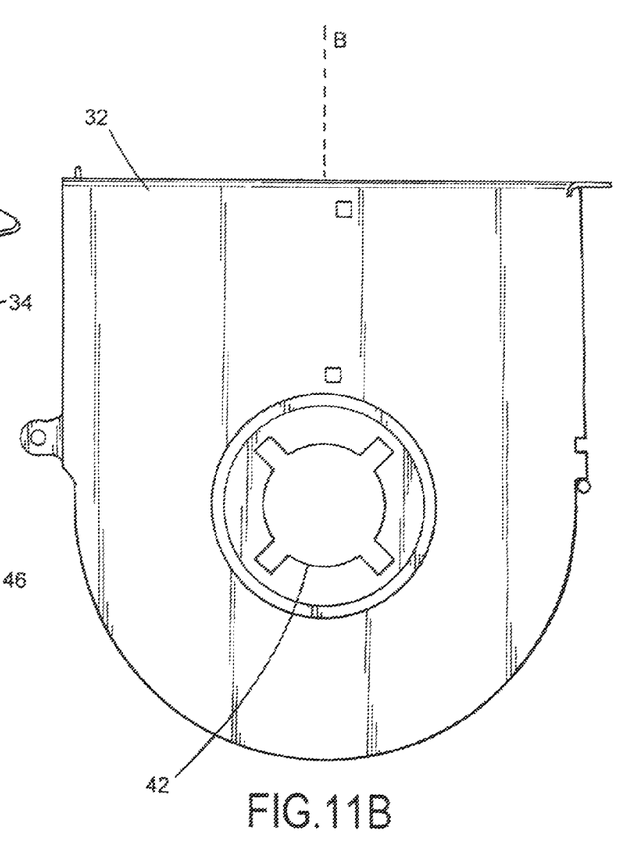
FIG. 11B is a right elevation view of the boot portion of FIG. 11A.

As shown in FIGS. 11A and 11B, the boot portion 28 of the housing 18 includes a front wall 38, a rear wall 40, a bottom wall 36, and side walls 32, 34. The right wall 32 is a planar wall having an aperture 42 to allow for sprocket or bearing mounting 26 to mount therethrough. The bottom wall 36 is a concave wall having a semi-circular cross-section and preferably configured as an access door.

Left wall 34 is a planar wall and forms an inlet 46 for receiving a flow of clean grain from the transition chamber 14. The inlet 46 is sized and shaped to be congruent with the size and shape of a transition chamber outlet 48, further discussed below. That is, the inlet 46 is configured with the same asymmetric shape as the transition chamber outlet 48.

Figure 3:
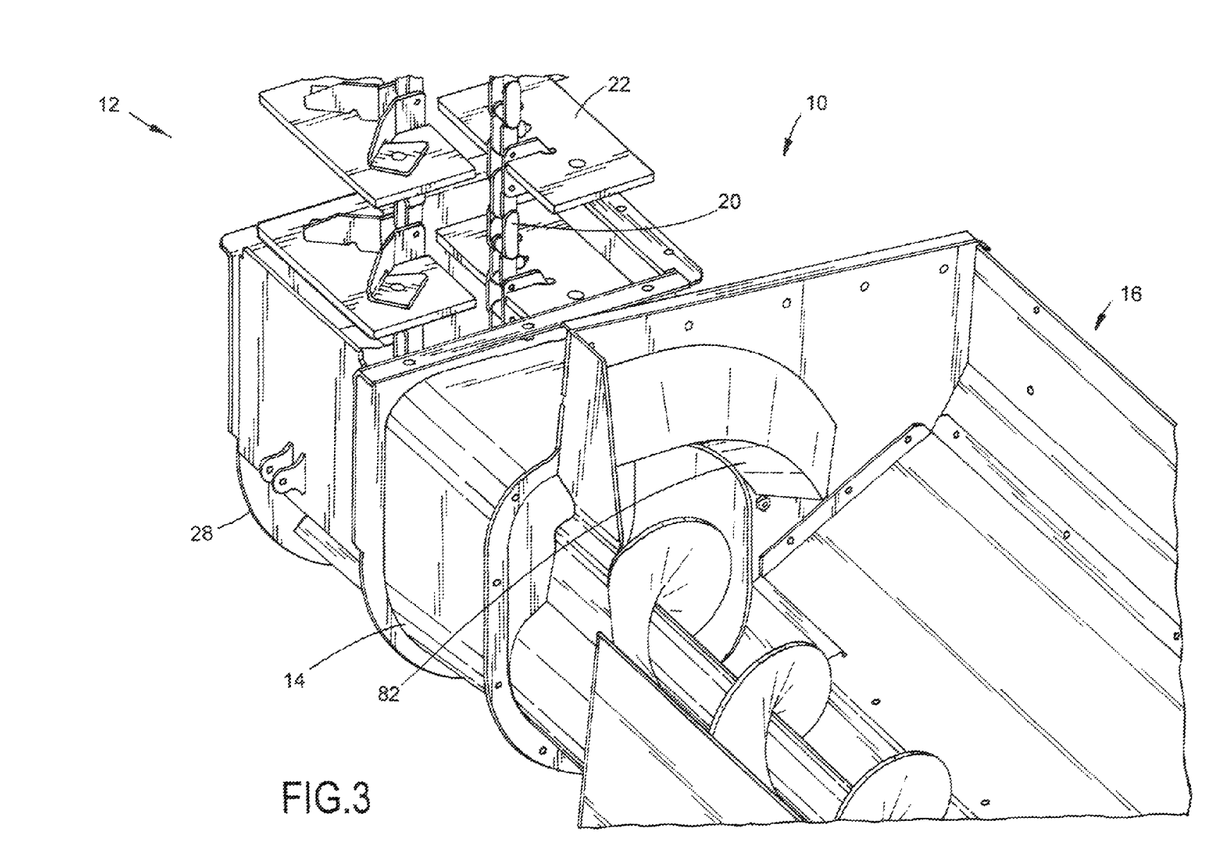
FIG. 3 is an enlarged partial perspective view of the clean grain conveyor of FIG. 2.
Figure 4:
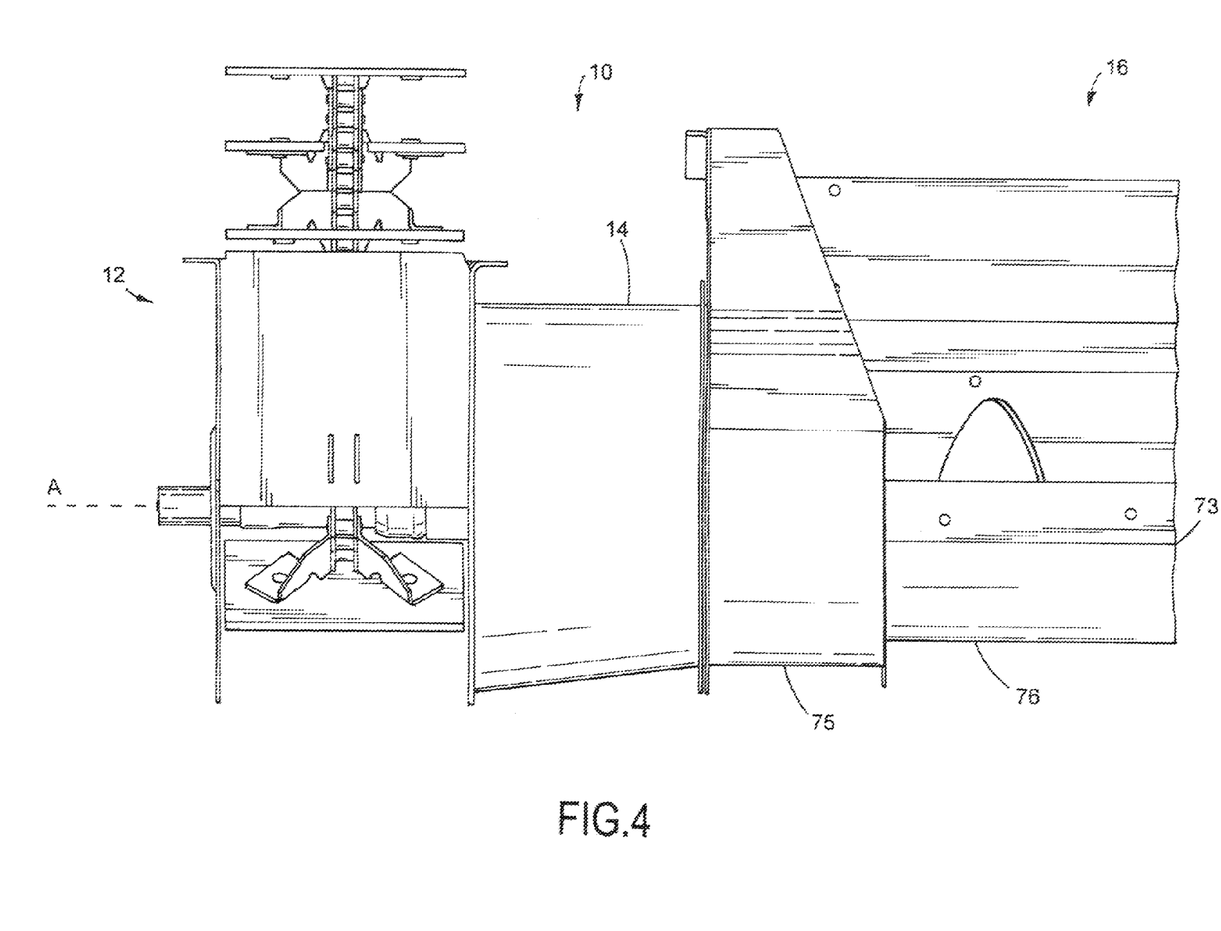
FIG. 4 is an enlarged partial front elevation view of the clean grain conveyor of FIG. 2.

Referring to FIG. 3, the grain elevator 12 is preferably configured within the housing 18 and boot portion 28, as shown. In this configuration, the paddles 22 are configured to move in a downwardly direction about a first or return side (e.g., a front side) of the housing 18 and in an upwardly direction about a second or grain conveyor side (e.g., rear side) of the housing 18. In other words, a longitudinal axis of the sprocket 26 extends parallel to a sagittal plane B (FIG. 11B) dividing the housing 18 into a first side and a second side.

Referring to FIGS. 2-5 and 10A-D, the transition chamber 14 is configured as best shown in FIGS. 10A-D. The transition chamber 14 includes a non-cylindrical tubular body 50 having a right end 52 and a left end 54 located opposite the right end 52. The right end 52 includes the outlet 48 of the transition chamber 14 while the left end 54 includes an inlet 56 of the transition chamber 14 which is in fluid communication with the outlet 48.

Figures 10A, 10B:
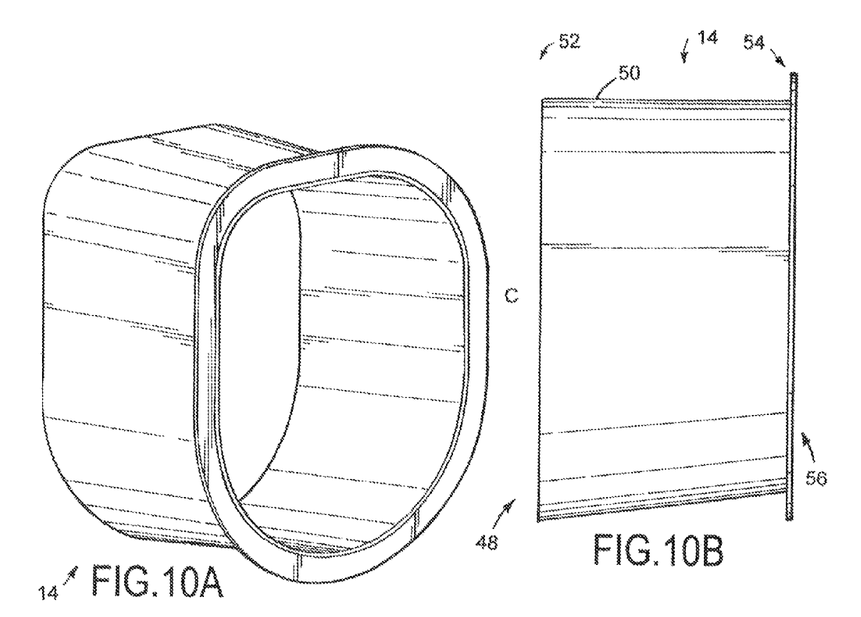
FIG. 10A is a perspective view of a transition chamber of the clean grain conveyor of FIG. 2.
FIG. 10B is a front elevation view of the transition chamber of the clean grain conveyor of FIG. 10A.
Figure 10C:
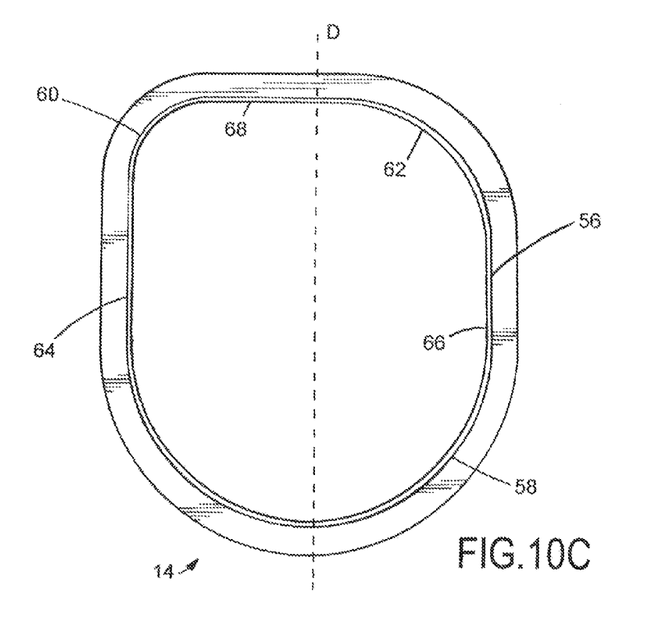
FIG. 10C is a left elevation view of the transition chamber of the clean grain conveyor of FIG. 10A.
Figure 10D:
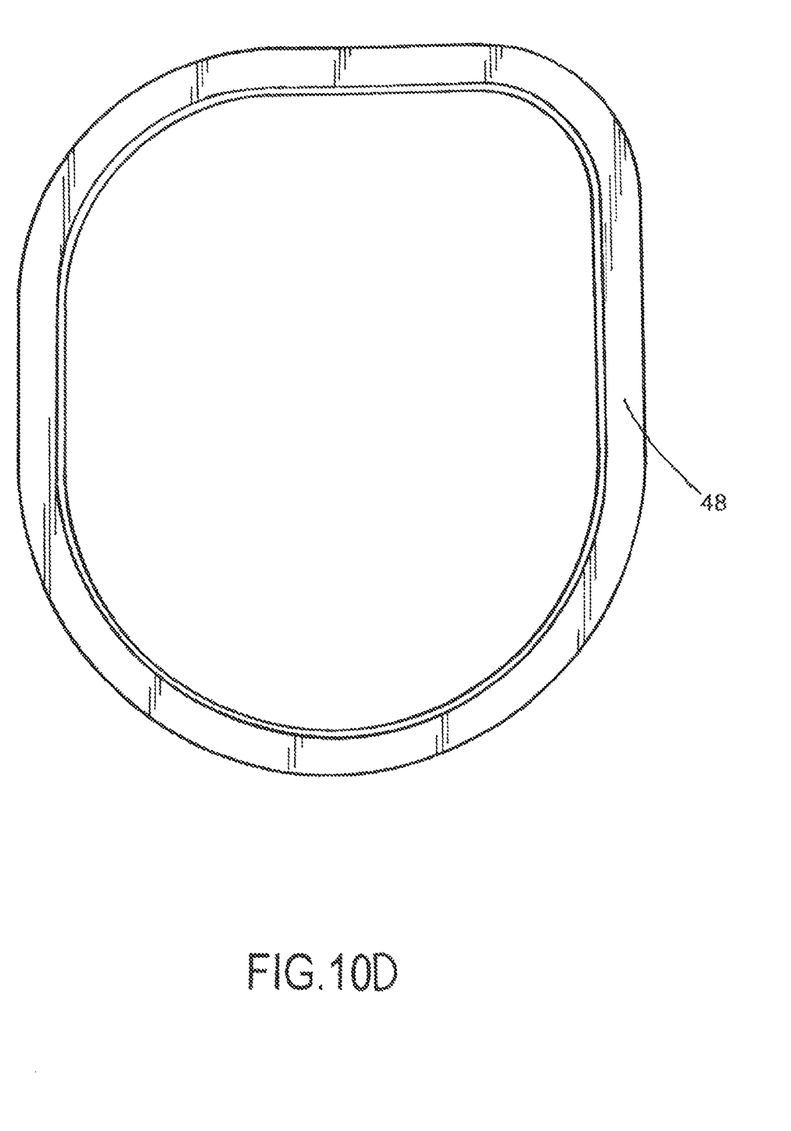
FIG. 10D is a right elevation view of the transition chamber of the clean grain conveyor of FIG. 10A.

FIG. 10C illustrates a left elevation view of the non-cylindrical tubular body 50. As can be seen in FIG. 10C, the tubular body 50 has an asymmetric inlet 56 and a corresponding asymmetric outlet 48 (FIG. 10D). Likewise, the noncylindrical tubular body 50 has a cross-section perpendicular to a longitudinal axis C (FIG. 10B) that is asymmetric and corresponds to the shape of the inlet and outlet 56, 48. The overall asymmetric shape of the tubular body 50 is representative of the shape of the inlet 56 formed at least by a semicircle 58 having a first radius of curvature, a second curve 60 having a second radius of curvature smaller than the first radius of curvature, and a third curve 62 having a third radius of curvature larger than the second radius of curvature. The asymmetric shape further includes a first planar segment 64 extending between the semicircle 58 and the second curve 60 and a second planar segment 66 extending between the semicircle 58 and the third curve 62. The first planar segment 64 and the second planar segment 66 are diametrically opposed and preferably parallel to each other, but can optionally be configured non-parallel to each other. The asymmetric shape further includes a third planar segment 68 extending between the second curve 60 and the third curve 62. The third planar segment 68 is substantially perpendicular to at least one of the first and second planar segments 64, 66.

Additionally, owing to the non-cylindrical configuration of the tubular body 50 and the planar segments 64, 66, the transition chamber 14 has an enlarged plenum 71 (FIG. 6) above the auger 30 which is situated within the transition chamber 40 adjacent the bottom semicircular wall of the transition chamber 14. The enlarged plenum 71 has a size significantly larger than that compared to conventional transition chambers above the auger 30 and thus advantageously allows for the auger 30 to convey grain within the transition chamber 14 in a manner similar to that of an open-topped trough, i.e., to prevent any hindrance or resistance to the flow of grain above the auger 30 within the transition chamber 14. That is, the transition chamber 14 advantageously removes restrictions of the flow of grain generated by the auger 30 as a result of the increased space above the auger 30 within the transition chamber 14. Such increased spacing between the auger 30 and the top walls of the transition chamber 14 further results in decreased wear of components of the grain conveyor as a result of removing restrictions to the flow of grain.

A gain in capacity is also realized by increasing the cross-sectional area of the transition chamber 14 and the outlet 48. The increased cross-sectional area of the transition chamber 14 allows for an increase in the amount of grain that can be fed to the grain elevator 12, and more specifically between the elevator paddles 22 thereby increasing the elevator capacity and efficiency. Further, the larger diameter of the auger flights (further discussed below) that passes through the transition chamber 14 increases the activity surface of the auger for increasing the amount of grain that is fed to the grain elevator 12 and overall efficiency of the grain conveyor 10.

FIG. 10C illustrates a left elevation view of the transition chamber 14 with a sagittal plane D shown dividing the transition chamber 14 into a first side (e.g., a front side) and a second side (e.g., a rear side). The front side of the asymmetric tubular body 50, as viewed in FIG. 10C and defined by the semicircle 58, second curve 60 and sagittal plane D, has a cross-sectional area greater than a cross-sectional area of the rear side of the asymmetric cross-section defined by the semicircle 58, the third curve 62 and sagittal plane D. Further, the outlet's upper front portion defined by the tubular housing 50 extends further outwardly from the sagittal plane D compared to the outlet's upper rear portion. The bottom portion of the tubular housing 50 is symmetric about sagittal plane D. The upper portion of the tubular housing 50 is asymmetric about sagittal plane D.

When the transition chamber 14 is assembled to the grain elevator 12 (FIG. 3), the front side of the asymmetric tubular body 50 of FIG. 10C is positioned to correspond to the front side of the boot portion 28 of the housing 18. Further, the rear side of the asymmetric tubular body of FIG. 10C is positioned to correspond to the rear side of the boot portion 28. That is, the front side of the outlet 48 is in fluid communication with the front side of the boot portion's inlet 46 and the rear side of the outlet 48 is in fluid communication with the rear side of the boot portion's inlet 46. Further, the right end 52 of the transition chamber 14 is sealingly engaged with the left wall 34 of the boot portion 28.

In operation, as grain is conveyed through the transition chamber 14, due to the increased cross-sectional area of the upper front portion of the tubular body 50, grain is more efficiently and effectively conveyed to the front side or return side of the grain elevator 12. Further, due to the configuration of the tubular body 50, grain is conveyed at a higher rate compared to conventional transition chambers to the grain elevator's boot portion. Moreover, as a result of the relatively reduced cross-sectional area of the upper rear portion of the tubular body 50 compared to the upper front portion of the tubular body 50, the amount of grain falling back or reverted back to the transition chamber 14 is reduced or prevented as grain is conveyed upwards within grain elevator 12.

Referring back to FIGS. 10A-D, the overall profile shape of the inlet 56 and the outlet 48 are the same. However, the outlet 48 is preferably sized to be larger than the inlet 56. That is, the non-cylindrical tubular body 50 is tapered or frustum shaped, as best shown in FIG. 10B.

The cross-sectional profile of the outlet 48 of the transition chamber 14 matches or is congruent with the profile shape of the inlet 46 of the boot portion 28. In other words, the inlet 46 is formed substantially similar to inlet 56 and is formed by a semicircle having a first radius of curvature, a second curve having a second radius of curvature smaller than the first radius of curvature, and a third curve having a third radius of curvature larger than the second radius of curvature. The asymmetric shape further includes a first planar segment extending between the semicircle and the second curve and a second planar segment extending between the semicircle and the third curve. The first planar segment and the second planar segment are diametrically opposed and preferably parallel to each other, but can optionally be configured non-parallel to each other. The asymmetric shape further includes a third planar segment extending between the second curve and the third curve. The third planar segment is substantially perpendicular to at least one of the first and second planar segments. Thus, when the transition chamber 14 is assembled to the boot portion 28, the right end 52 of the transition chamber 14 sealingly engages the left wall 34 of the boot portion 28 such that the respective inlet and outlet openings are aligned.

Figure 6:
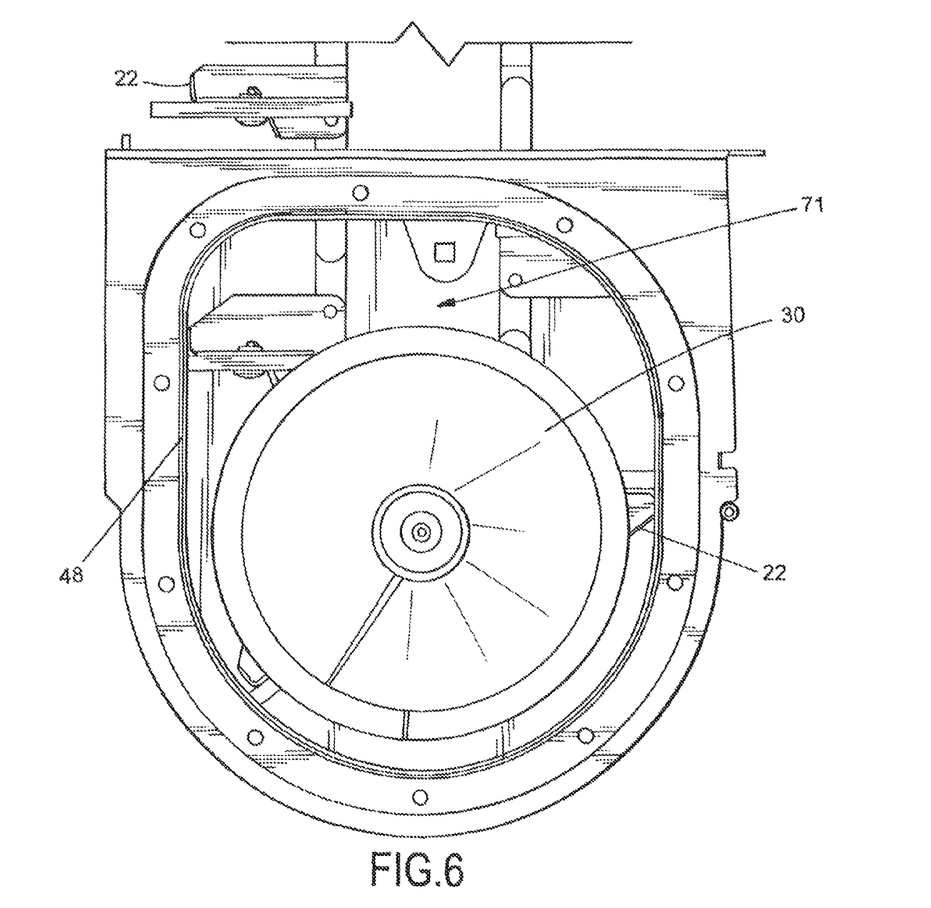
FIG. 6 is a left elevation view of the clean grain conveyor of FIG. 2.
Figure 7:
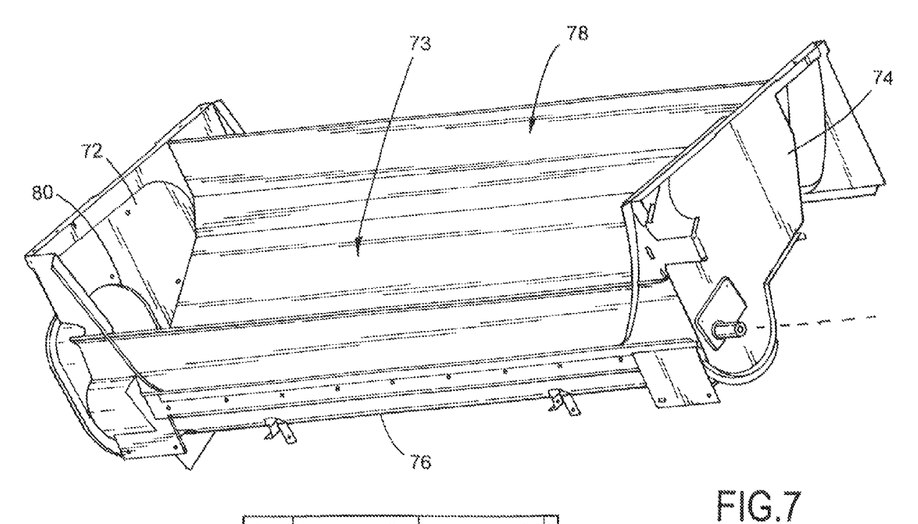
FIG. 7 is a perspective view of an auger housing assembly of the clean grain conveyor of FIG. 2.
Figure 7A:
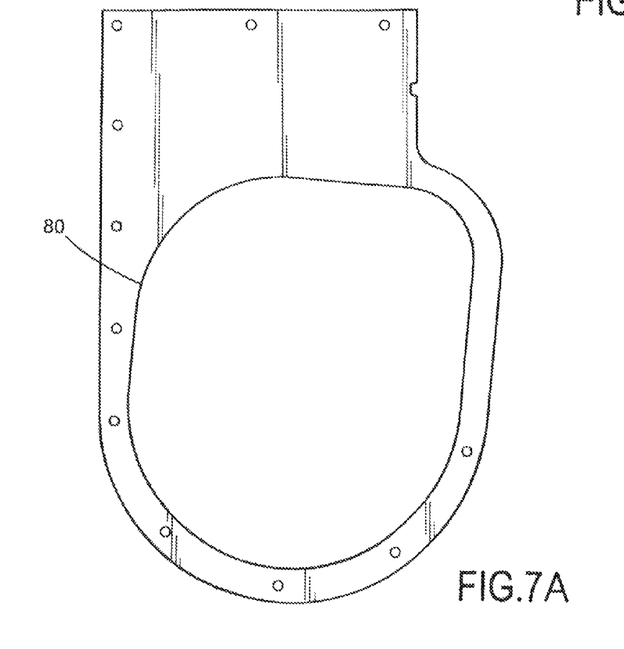
FIG. 7A is a partial right elevation view of an outlet of the auger housing assembly of FIG. 7.

Referring to FIG. 6, the front side of the asymmetric non-circular opening of the transition chamber outlet 48 facing the front side of the housing's boot portion inlet 46 is larger than the rear side of the asymmetric non-circular opening of the transition chamber outlet 48 facing the rear side of the boot portion inlet 46. Further, the volume above a top most edge of the auger 30 extending through the transition chamber 14 about its front side is larger than a volume above the top edge of the auger 30 about its rear side.

As shown in FIG. 6, the grain elevator 12 is configured with the paddles 22 moving downwardly about the front side of the housing 18, the transition chamber 14 being asymmetric with its larger upper end portion being the front upper end portion, and the auger 30 oriented to rotate in a counterclockwise direction, when viewed as shown. However, the grain conveyor 10 can alternatively be configured to have the paddles 22 of the grain elevator 12 moving downwardly about the rear side of the housing 18, the transition chamber 14 being asymmetric with its larger upper end portion being the rear upper end portion, and the auger 30 oriented to rotate in a clockwise direction, when viewed as shown in FIG. 6.

Referring to FIGS. 2-5, 7 and 8, the auger assembly 16 (or auger conveyor) includes an elongated trough 73 and the auger 30. The elongated trough 73 includes a first end wall (i.e., a right wall) 72, a second end wall (i.e. a left wall) 74 opposite the right wall 72, and a bottom wall 76 extending between the right wall 72 and the left wall 74. The elongated trough 73 is an open-topped trough. The open top of the elongated trough 73 forms an inlet 78 for receiving a flow of clean grain. The elongated trough 73 also includes an outlet 80 in fluid communication with the inlet 56 of the transition chamber 14. The shape of the outlet 80 (FIG. 7A) is congruent with the shape of the inlet 56, and similarly formed at least by a semicircle having a first radius of curvature, a second curve having a second radius of curvature smaller than the first radius of curvature, and a third curve having a third radius of curvature larger than the second radius of curvature. The asymmetric shape of the outlet 80 further includes a first planar segment extending between the semicircle and the second curve and a second planar segment extending between the semicircle and the third curve. The first planar segment and the second planar segment are diametrically opposed and preferably parallel to each other, but can optionally be configured non-parallel to each other. The asymmetric shape further includes a third planar segment extending between the second curve and the third curve. The third planar segment is substantially perpendicular to at least one of the first and second planar segments.

Figure 5:
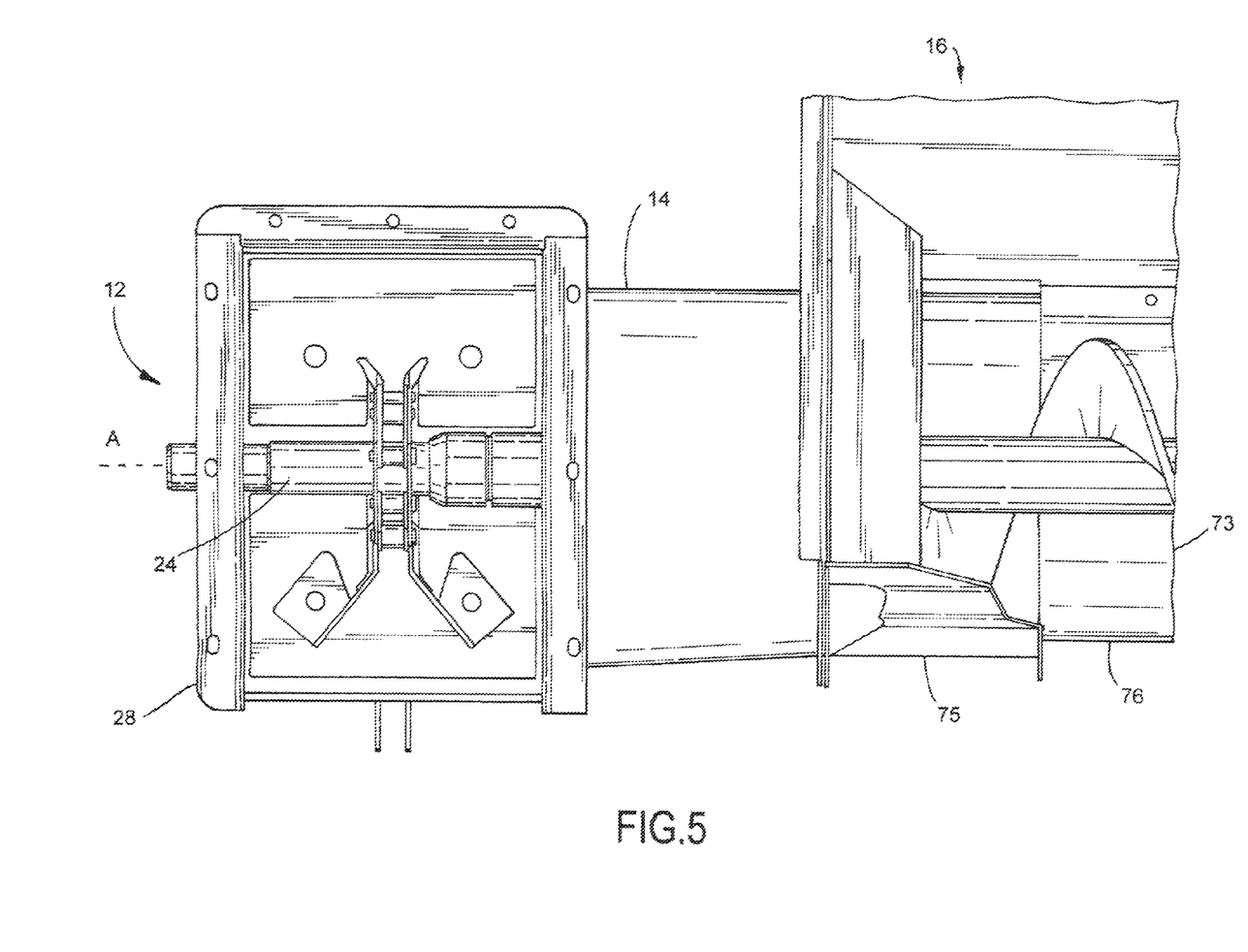
FIG. 5 is an enlarged partial top plan view of the clean grain conveyor of FIG. 2.

Referring to FIG. 5, the elongated trough 73 is configured to have an enlarged diameter bottom section 75 (i.e., a first section) adjacent the right wall 72. That is, elongated trough 73 includes a second bottom wall section 75 having a larger diameter and extending further downwards compared to the bottom wall 76 (i.e., a second section), which is sized and shaped to receive enlarged auger flights 31a of the auger 30, as further discussed below, when the auger 30 is assembled within the elongated trough 73. The enlarged diameter bottom section 75 extends an axial length of the elongated trough 73 a length equivalent to about ¼ to ¾ rotations of the enlarged auger flights 31a, and preferably about length equivalent to about ½ rotation of the enlarged auger flights 31a.

The auger 30 (FIG. 8) is situated within the elongated trough 73 and extends out through the auger assembly outlet 80, through the transition chamber 14, and is operatively connected to sprocket 26. The auger 30 is preferably an elongated spiral screw auger. The screw auger 30 is configured in end to end relation within the elongated trough 73 and conveys crop material from a first end of the elongated trough 73 to a second end of the elongated trough 73, through the transition chamber 14 and into the grain elevator 12.

Figure 8:
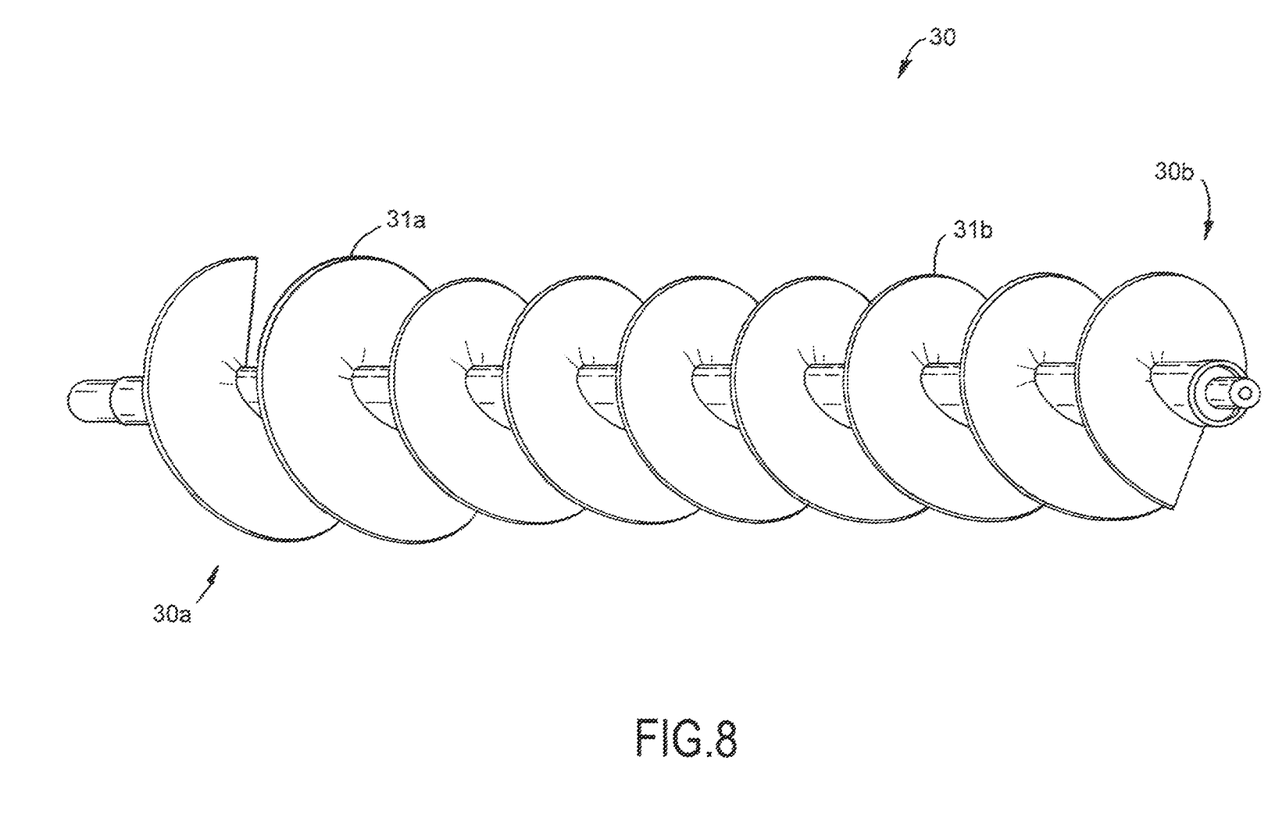
FIG. 8 is a perspective view of an auger used in the auger housing assembly of FIG. 7.

The auger 30 includes a first end 30a (i.e., a right end) and a second end 30b (i.e., a left end) opposite the first end 30a. The auger 30 also includes a second set of auger flights 31b extending from the second end 30b to a majority of a length of the auger axis. Proximate the first end 30a, the auger includes a first set of auger flights 31a. The first set of auger flights 31a is configured to have a larger overall diameter compared to the second set of auger flights 31b. The first set of auger flights 31a also extends a length along the auger axis so as to completely extend through the transition chamber 14 when assembled thereto. The first set of auger flights 31 also extends a length beyond the transition chamber 14 to the enlarged diameter bottom section 75 of the elongated trough 73 so as to be situated therein (i.e., within the first section). Preferably, the first set of auger flights 31a extends a length along the auger axis of about 1 to 2 full rotations and more preferably about 1.5 rotations of the auger flights 31a. Alternatively, instead of a dual diameter auger, a single diameter auger as readily known in the art can be used in accordance with the present invention. Exemplary single diameter augers applicable to the present invention are disclosed in U.S. Pat. No. 6,350,197, the entire disclosure of which is hereby incorporated by reference herein.

Figure 9A:
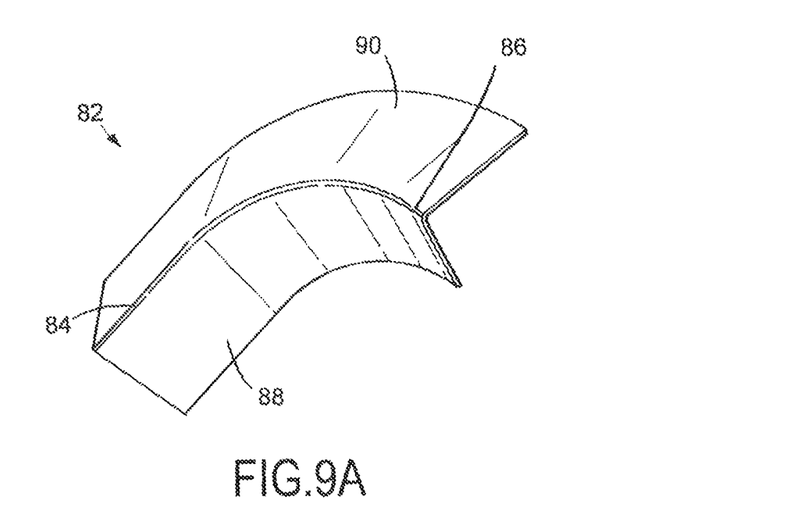
FIG. 9A is a front perspective view of a baffle of the clean grain conveyor of FIG. 2.
Figure 9B:
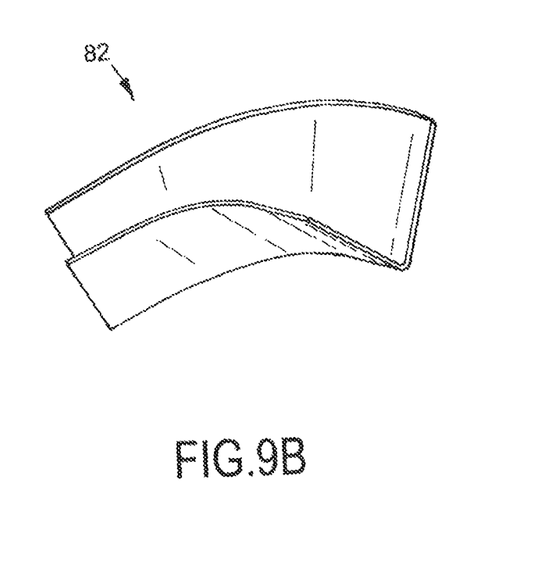
FIG. 9B is a rear perspective view of the baffle of the clean grain conveyor of FIG. 9A.

Referring to FIGS. 3, 9A and 9B, the auger assembly 16 further includes a baffle 82 connected to the right wall 72 and positioned adjacent the auger assembly outlet 80. The baffle 82 is configured as best shown in FIGS. 9A and 9B and includes a linear segment 84 and a curved segment 86. The curved segment 86 has a curve that is congruent with the third curve of the outlet 80. The baffle 82 is also configured to have a longitudinal cross-section substantially configured as a "V" formed by a first wall 88 and a second wall 90.

The baffle 82 is positioned so as to extend inwardly from the right wall 72 and above the auger 30. Preferably, the baffle 82 is positioned adjacent the outlet opening 80 of the auger assembly 16 about an inner surface of the right wall 72. When mounted to the right wall 72, the first wall 88 of the baffle 82 is angled outwardly from a longitudinal axis of the auger 30 and rearwardly of the auger assembly 16, as shown in FIG. 3.

In operation, as the combine harvester 1 harvests crops, crop material is fed to the combine's feeder housing. The harvested crop material then passes through a threshing and separating assembly and the crop material is impacted and/or rubbed, thereby causing the grain to separate from the stalk material. The grain is then deposited into a grain cleaning system and the grain cleaning system further separates the grain from the material other than grain. The material other than grain is moved rearward and eventually expelled from the back of the combine. The clean grain is then fed into the inlet 78 of the auger assembly 16.

Once the clean grain has entered the auger assembly 16, the grain is conveyed towards the outlet 80 by the auger 30. As discussed previously, the auger 30 is situated within the elongated trough 73 and as the auger 30 rotates, grain flows towards the right wall 72. As grain flows towards the right wall 72 it is expelled from the outlet 80 and into the transition chamber 14 via the transition chamber's inlet 56. Owing to the operation of the spiral auger 30, as grain is conveyed along the trough 73, grain rises above a height greater than a top most edge of the auger flights. However, the baffle 82 advantageously deflects grain situated above the auger 30 and proximate the outlet 80 towards the center of the auger 30 or downwardly to effectuate a more efficient and greater output of grain to the transition chamber 14. In other words, the auger assembly 16, owing to the baffle 82, enlarged auger flights 31a and the enlarged diameter section 75 of the elongated trough 73, advantageously allows a greater amount of grain to be fed to the transition chamber 14 at a given auger speed leading to a greater amount of grain being fed to the grain elevator 12 and improving the overall efficiency of the combine 1.

As grain flows into the transition chamber 14, the auger 30 continues to rotate and conveys the grain towards the grain elevator 12. The transition chamber 14 is sized so as to increase its cross-sectional area of the transition chamber 14 as it extends from the inlet 56 to the outlet 48. That is, the transition chamber 14 has a variable increasing cross-section which increases extending from the inlet 56 towards the outlet 48. The tapered configuration of the transition chamber 14 encourages the flow of grain to move from the inlet 56 to the outlet 48 and into the grain elevator 12.

As grain is conveyed towards the outlet 48 of the transition chamber 14 the flow of grain generated by the rotating auger 30 accumulates towards the upper front side of the auger (due to its direction of rotation) and above the height of the auger flights more so than compared to the upper rear side of the auger. Thus, as the outlet 48 of the upper front side of the transition chamber 14 is configured with an enlarged opening (relative to the upper rear side), it allows for greater amounts of grain to be fed between the elevator paddles. Additionally, the upper front side of the transition chamber 14 is configured with an enlarged opening (relative to the upper rear side) to allow for greater amounts of grain to be fed between the elevator paddles. Feeding grain into the elevator in the upper front side of the transition chamber 14 is advantageous as there is little or no resistance from grain between the elevator paddles in that area. As the plurality of paddles 22 rotate through the housing 18, grain is conveyed towards the rear side of the boot portion 28. The upper rear portion of the transition chamber outlet 48 and boot portion inlet 46 is smaller compared to the upper front portion, thus inhibiting or reducing the amount of grain capable of falling back or being reverted back towards the transition chamber 14 from the boot portion 28.

It will be appreciated by those skilled in the art that changes could be made to the embodiments described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. A grain conveyor for a combine harvester comprising:
   a grain elevator having an inlet for receiving a flow of grain; and
   a transition chamber connected to the grain elevator, the transition chamber including:
   an inlet having a non-circular opening, and
   an outlet in fluid communication with the transition chamber inlet and the grain elevator inlet, the transition chamber outlet having an asymmetric non-circular opening larger than the non-circular opening of the transition chamber inlet.

2. The grain conveyor of claim 1, wherein the grain elevator includes:
   a housing having a boot portion forming the inlet for receiving the flow of grain from the transition chamber; and
   a plurality of paddles connected to an endless chain within the housing, wherein the endless chain is operatively connected to a shaft within the boot portion, and wherein the plurality of paddles are driven in a downwardly direction about a first side of the housing and in an upwardly direction about a second side of the housing opposite the first side,
   wherein the asymmetric non-circular opening of the transition chamber outlet has a longitudinal axis substantially parallel to the shaft, and wherein the asymmetric non-circular opening of the transition chamber outlet facing the first side is larger than the asymmetric non-circular opening of the transition chamber outlet facing the second side.

3. The grain conveyor of claim 1, wherein the transition chamber tapers outwardly from the inlet to the outlet.

4. The grain conveyor of claim 1, wherein a longitudinal cross-sectional area of the transition chamber increases over the entire length of the transition chamber.

5. The grain conveyor of claim 1, wherein the transition chamber inlet and outlet have the same non-circular shaped opening.

6. The grain conveyor of claim 5, wherein the transition chamber outlet has a bottom section symmetric about a sagittal plane and an upper section asymmetric about the sagittal plane.

7. The grain conveyor of claim 1, further comprising an auger assembly operatively connected to the transition chamber, the auger assembly including an inlet for receiving a flow of grain and an outlet in fluid communication with the transition chamber inlet.

8. The grain conveyor of claim 7, wherein the auger assembly includes:
   an elongated trough; and
   an auger situated within the trough and extending out through the auger assembly outlet, and
   wherein a volume of a top portion of the transition chamber above a top edge of the auger and on the same side as the first side of the housing is larger than a volume of a top portion of the transition chamber above the top edge of the auger and on the same side as the second side of the housing.

9. The grain conveyor of claim 7, wherein the auger assembly includes:
   an elongated trough; and
   an auger situated within the trough and extending out through the auger assembly outlet, and
   wherein a longitudinal cross-sectional area of the transition chamber increases as the transition chamber extends from the auger assembly outlet to the grain elevator inlet.

10. The grain conveyor of claim 9, wherein the elongated trough includes a first section having an overall diameter larger than a second section, wherein the auger includes a first set of auger flights have a larger diameter than a second set of auger flights, and wherein the first set of auger flights is situated within the first section of the elongated trough.

11. The grain conveyor of claim 7, wherein the auger assembly includes:
   an elongated trough having a first end wall forming the auger assembly outlet, a second end wall opposite the first end wall, and a bottom wall extending between the first and second end walls;
   an auger situated within the trough and extending out through the auger assembly outlet; and
   a baffle connected to the first end wall and adjacent the auger assembly outlet.

12. The grain conveyor of claim 11, wherein the baffle is positioned above the auger.

13. A clean grain conveyor for an agricultural combine comprising:
   a paddle elevator having an inlet for receiving grain;
   an auger conveyor for conveying grain to the paddle elevator; and a transition chamber having an inlet and an outlet, and positioned between the paddle elevator and the auger conveyor for the passage of grain from the auger conveyor to the paddle elevator, the transition chamber having an asymmetric longitudinal cross-section formed at least by a semicircle having a first radius of curvature, a second curve having a second radius of curvature smaller than the first radius of curvature, and a third curve having a third radius of curvature larger than the second radius of curvature.

14. The clean grain conveyor of claim 13, wherein the cross-section further comprises a first planar segment between the semicircle and the second curve and a second planar segment between the semicircle and the third curve.

15. The clean grain conveyor of claim 14, wherein the first and second planar segments are diametrically opposed and parallel to each other.

16. The clean grain conveyor of claim 14, wherein the cross-section further comprises a third planar segment between the second curve and the third curve.

17. The clean grain conveyor of claim 16, wherein the third planar segment is substantially perpendicular to at least one of the first and second planar segments.

18. The clean grain conveyor of claim 13, wherein the cross-sectional area of the asymmetric cross-section formed by the semicircle and second curve is greater than a cross-sectional area of the asymmetric cross-section formed by the semicircle and the third curve.

19. The clean grain conveyor of claim 13, wherein the asymmetric cross-section of the transition chamber has a bottom section symmetric about a sagittal plane and an upper section asymmetric about the sagittal plane.

20. The clean grain conveyor of claim 13, wherein the auger conveyor includes:
an elongated trough having a first end wall, a second end wall opposite the first end wall, and a bottom wall extending between the first and second end walls;
an auger situated within the trough; and
a baffle connected to the first end wall and positioned above the auger.

21. A grain conveyor for a combine harvester comprising:
a grain elevator having an inlet for receiving a flow of grain;
a transition chamber connected to the grain elevator, the transition chamber including:
an inlet having a non-circular opening, and
an outlet in fluid communication with the transition chamber inlet and the grain elevator inlet, the transition chamber outlet having an asymmetric non-circular opening; and
an auger assembly operatively connected to the transition chamber, the auger assembly including an inlet for receiving a flow of grain and an outlet in fluid communication with the transition chamber inlet.

22. The grain conveyor of claim 21, wherein the auger assembly includes:
an elongated trough; and
an auger situated within the trough and extending out through the auger assembly outlet, and
wherein a longitudinal cross-sectional area of the transition chamber increases as the transition chamber extends from the auger assembly outlet to the grain elevator inlet.

23. A grain conveyor for a combine harvester comprising:
a grain elevator that includes:
an inlet for receiving a flow of grain,
a return side, and
a grain conveyor side opposite the return side; and
a transition chamber connected to the grain elevator, the transition chamber including:
an inlet, and
an outlet having a non-circular opening in fluid communication with the transition chamber inlet and the grain elevator inlet, and
wherein the outlet has a first side in facing engagement with the return side of the grain elevator inlet that is larger than a second side in facing engagement with the grain conveyor side of the grain elevator.

\* \* \* \* \*